United States Patent Office 3,213,322
Patented Oct. 19, 1965

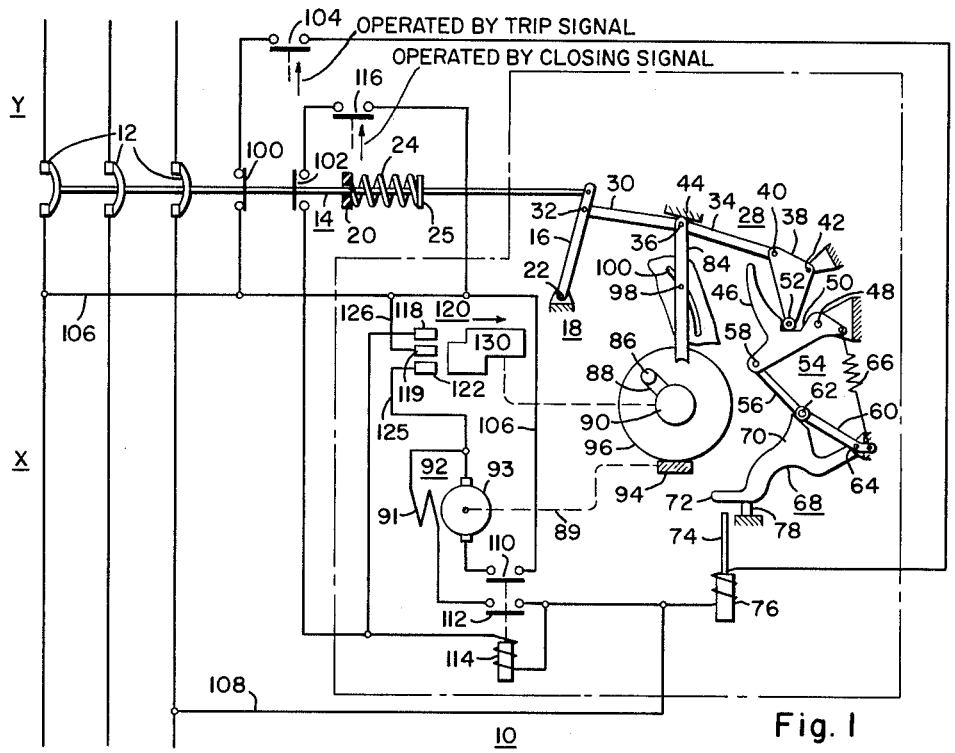

3,213,322
ELECTRIC BRAKE FOR CIRCUIT INTERRUPTERS
Robert E. Bruderly, North Huntingdon Township, Westmoreland County, Pa., assignor to Westinghouse Electric Corporation, East Pittsburgh, Pa., a corporation of Pennsylvania
Filed Mar. 27, 1962, Ser. No. 182,767
6 Claims. (Cl. 317—22)

This invention relates to circuit interrupters, and more particularly to motor operated reclosers.

Some circuit breakers are equipped with motorized reclosures in which the breaker closure cycle is initiated by an operating or command signal which closes motor circuit, after which the motor circuit is latched by operation of motor responsive contacts until the closure cycle is completed. When the closure cycle is completed, the motor responsive latch contacts release to open the motor circuit, and the motor is braked to a stop by a centrifugal friction brake to prevent reengagement of the latch contacts and set up the recloser for the next closing cycle. For reasons of practicality and compactness, the brake is integral with the motor housing. A centrifugal friction brake supplies braking force in proportion to motor speed, thus providing substantially continuous "damping" action. This generates heat which, because of the proximity of the brake to the motor, affects the motor and severely limits the number of consecutive operations that the motor is capable of making. Another disadvantage of a mechanical brake is the wear inherent in such a device. This is a source of trouble during the life of a circuit breaker. In accordance with one embodiment of the present invention, the above-mentioned disadvantages are overcome and new advantages accrue in a motorized recloser of a circuit interrupter by use of a normally ineffective dynamic brake circuit which is automatically set up and rendered effective at an appropriate time during the closing cycle.

It is therefore an object of the present invention to provide a novel automatic brake system for the motor of a motorized recloser.

It is another object of the invention to provide a more efficient and economical automatic brake system for the motor of a motorized circuit reclosure.

A further object of the invention is to provide a brake in apparatus of the character described which brake does not have the heat and wear problems of a frictional brake.

Other and further objects and advantages will become evident from the following detailed description taken in connection with the drawings wherein:

FIGURE 1 is a hybrid diagram of a circuit breaker with a recloser incorporating a preferred embodiment of the invention; and, FIGS. 2 and 3 are views illustrating structure and correlation of parts of the drum switch driven by the motor in FIG. 1.

In FIG. 1, the circuit interrupter is designated by the general reference numeral 10, and is provided with separable main contacts 12 for interrupting power between polyphase lines X and Y in case of a fault. The contacts 12 are moved through a linkage 14 from one to the other of closed and opened positions by an operating lever 16 of an electromechanical operating mechanism 18 having mechanical portions which are, by way of example, the same as those in the motorized operating mechanism shown and described in detail in U.S. Patent No. 2,858,395, issued on October 28, 1958 to A. R. Harm et al. and entitled "Automatic Recloser" (FIG. 2). However, the electrical circuitry of the operating mechanism 18 is novel and in combination with the mechanical structure forms the subject matter of the present invention.

Certain of the mechanical parts of the operating mechanism 18 requiring relatively fixed points are conveniently mounted on a frame represented by the dot and dash line 20. This frame may in turn be mounted within a common housing (not shown) enclosing the rest of the circuit interrupter components such as the contacts 12, linkage 14, and auxiliary circuitry. The operating lever 16 is pivotally mounted on a shaft 22 mounted in frame 20, and is biased in the clockwise direction by means of a compression spring 24 in compression between a collar 25 fixed to linkage 14 and a point on the frame 20. The contacts 12 and 100 are resiliently mounted (not shown) to provide contact pressure, and to absorb overtravel of the operating mechanism. The lever 16 is releasably held in the closed position shown with the spring 24 compressed by means of a toggle linkage 28 including a link 30 connected to lever 16 by a pivot 32, a toggle link 34 pivotally connected to the link 30 by a common pivot 36, and a latch lever 38, which is connected to the toggle link 34 by a pivot 40 and is rotatably mounted on a shaft 42 supported in the frame 20.

The toggle linkage 28 in the position shown, has the toggle link 34 resting against a stop 44 fixed to frame 20, with the pivots 36 and 40 in overcenter positions. The pivot 40 is maintained in this position by means of a latch 46, which is pivotally mounted in the frame 20 on a shaft 48, and has a recess 50 which receives a roller 52 on a lower portion of latch lever 38. The latch 46 is maintained in the position shown, by a toggle linkage 54 including a link 56 pivotally connected to the latch 46 through a pivot 58, and a link 60 connected to link 56 by a pivot 62 and rotatably supported in the frame 20 on a fixed pivot 64. A spring 66 connected between link 60 and latch 46 applies a clockwise bias to latch 46 and a counterclockwise bias to link 60. A trip lever 68 is rotatably mounted on the pivot 64, and has a projection 70 for actuating the common pivot 62 overcenter. Trip lever 68 also has a laterally projecting pad 72 for receiving the impact of the armature 74 of a trip solenoid 76. The armature 74 engages and operates the trip lever 68 in a clockwise direction in response to a trip signal as later described. A stop 78 fixed relative to the frame 20, normally engages pad 72 and holds the trip lever 68 in a position with the toggle levers 56 and 60 slightly overcenter.

When the trip lever 68 is rotated clockwise, projection 70 breaks the toggle linkage 54, permitting latch 46 to rotate counterclockwise and release roller 52. Lever 38 rotates clockwise due to force of charged spring 24, and pivot 40 moves further overcenter, causing pivot 36 to drop undercenter and permit spring 24 to rotate operating lever 16 clockwise, thereby moving linkage 14 to the right so as to open main contacts 12.

From a tripped or open position, the main contacts 12 are closed by moving upward a closing link 84 connected at its upper end to the common pivot 36. Upward movement of the closing link forces the toggle linkage 28 to the overcenter (overtoggle) position and in doing so moves operating lever 16 to the left to close contacts 12 and charge spring 24. The closing link 84 is moved upward when engaged by a roller 86 carried by a closing crank 88 fixed to a shaft 90 which is driven by a motor 92 through a gear arrangement coupled to the output shaft 89 of motor 92. The motor 92, which by way of example is shown as a series motor, includes a field 91 and an armature 93 and is energized, braked and deenergized at appropriate times in response to electrical circuitry to be described. In the example shown, the armature 93 is the rotor of the motor. The gear arrangement between the motor 92 and shaft 90 includes a worm 94 driven by the motor 92 and engaging a worm gear 96 fixed to the shaft 90. In its upward and downward excursions, the closing lever 84 is provided with appropriate lateral guidance, for proper engagement and disengagement with the roller 86, by a guide pin 98 fixed to the link 84 and riding in a slot 100 formed in a member fixed to the frame 20.

The electrical circuit includes auxiliary contacts 100 and 102 operated by the operating lever 16 through linkage 14. As a point of reference, the apparatus shall be arbitrarily considered in normal position when at rest, that is, when linkage 28 is in the collapsed state and lever 16 (forced clockwise by spring 26) is holding contacts 12 open. Under these conditions, contact 100 is open while contact 102 is closed. Thus, contact 100 is normally open, and closes when lever 16 is operated to the left by linkage 28 during the closing cycle of operating mechanism 18. On the other hand, contact 102 is normally closed, and is opened by lever 16 during the closing cycle of mechanism 18.

Contact 100 is part of a trip circuit including trip solenoid 76 and a contact 104, which may be operated by a relay (not shown) in response to a trip signal, for example, overcurrent or reverse current in the network in which the circuit interrupter is connected. Contact 100 sets up the trip circuit when contacts 12 are closed. The trip circuit is connected to and receives power for the trip solenoid 76 from conductors 106 and 108 connected across one of the phases of the line X.

Lines 106 and 108 also supply power to the motor 92 through normally open contacts 110 and 112 of a relay 114, when the latter is energized from lines 106 and 108 either through a circuit including contact 102 and a contact 116, or through a circuit including contacts 118 and 119 and a rotating conductive segment 130 of a drum switch 120 operated by shaft 90. Contact 116 may be closed by a relay (not shown) in response to a closing signal, for example a signal representing proper voltage and phase conditions of the lines X and Y. When closed, contacts 102 and 116 connect one side of the operating coil of relay 114 to line 106, the other side of the relay coil being connected to line 108.

After the motor begins to rotate shaft 90 (counterclockwise) in response to operation of contact 116, the contacts 118 and 119 are closed with segment 130 to latch the motor relay 114 and maintain power to the motor. A travel interval after contact 118 is closed, roller 86 of the closing crank 88 engages the lower end of closing link 84, thus forcing the common pivot 36 of the toggle linkage 28 to the overcenter position shown. This causes rotation of the closing lever 16 counterclockwise to close the main contacts 12 and contact 100, the latter to set up the trip circuit. Movement of operating lever 16 to the left also opens the reset contact 102.

When the pivot 36 goes overtoggle (overcenter), it strikes stop 44, and the linkage 28 is held in the overcenter position by the force of spring 24 and the latch 46 thus latching the circuit interrupter in the closed position. About 20° of crank 88 travels before the pivot 36 goes overtoggle, the switch segment 130 which is already in contact with contact finger 119, further engages a contact finger 122 of the drum switch 120 thereby shorting the motor armature 93 and creating a generating effect to provide dynamic braking which slows the motor 92.

Thus a normally ineffective dynamic braking circuit including a conductor 125, switch contact fingers 119 and 122, a conductor 126, the portion of conductor 106 between conductor 126 and relay contact 110, and the relay contact 110 (closed), is rendered effective by connecting it across the motor armature 93, which connection is made when the drum switch segment 130 engages contact finger 122 to complete the circuit between contact fingers 119 and 122. At the point of crank 88 travel, where pivot 36 goes overtoggle, contact 118 opens (disengaged by segment 130), which releases the motor relay 114 causing contacts 110 and 112 to open, thereby deenergizing the motor field and removing the short from the armature. After the pivot 36 has gone overtoggle, the closing crank 88 drifts approximately 45° to a frictional stop, during which drift, contact 122 is opened thereby setting up the mechanism for the next closing operation.

Details of the drum switch 120 and an example of the correlation between the operation of the drum switch contacts and the position of the crank 88 are shown in FIGS. 2 and 3. FIG. 2 shows the crank 88 in the overtoggle position, while FIG. 3 is a developed view of the drum switch showing the relation between parts of the switch when the crank 88 has drifted about 45° overtoggle. As seen in FIG. 2, drum switch 120 includes an arcuate conductive segment 130 secured to an insulating sleeve 132 keyed to shaft 90. The contact fingers 118, 119 and 122, which are engaged by the conductive segment 130 at appropriate times are mounted on an insulating strip 134 fixed to the frame 20. The segment 130 is irregular in shape and so arranged that as the drum segment 130 moves counterclockwise in FIG. 2 (direction of arrow in FIG. 3), the segment 130 makes contact with and engages contacts 118 and 119 30° before the roller or crank 88 engages the lower end of the operating link 84.

As the motor 92 starts to rotate counterclockwise in response to closing of contact 116 and operation of relay 114, the crank 88 first reaches point A (FIG. 2), at which time contact fingers 118 and 119 are engaged by the conductive segment 130, thus latching the motor energizing circuit. When the crank 88 reaches point B in FIG. 2, it engages the closing link 84 to drive it and pivot 36 upward. As the crank 88 continues to rotate, and is somewhere between points B and C, contacts 12 make and the contact force is increased through spring 24 upon continued counterclockwise rotation of the crank until the toggle linkage 28 reaches center, which is at about point C, at which point the contact closing load eases. In the example shown, the dynamic braking is applied at this point by the engagement of contact finger 122 with segment 130. As the counterclockwise movement of the crank arm 88 continues, the toggle linkage 28 goes overcenter forcing the latch lever 38 and latch 46 into latching position and locking the circuit breaker in the closed position. This occurs with the crank 88 at approximately point D, at which time segment 130 leaves contact 118, thereby releasing relay 114 and opening the motor field and armature circuits at contacts 110 and 112. After this the crank 88 drifts to a stop at a point F within about 45°, during which drift, for example, after approximately 30°, segment 130 disengages from contacts 119 and 122. This occurs when crank 88 is at point E. The opening of contact 122 is delayed up to this point to provide sufficient time for relay 114 to settle in the release position. In FIG. 3, the points A', B', C', D', E' and F' indicate the positions of contact fingers 118, 119 and 122 with respect to segment 130 when the crank 88 is respectively at points A, B, C, D, E and F, respectively.

It should be understood that the dynamic braking may be applied at any other predetermined time after the motor is energized, by either advancing or retarding the point at which the segment 130 closes the braking circuit. This may be done, for example, by changing the relative location of the segment or by reshaping the segment or both.

As hereinbefore described, the opening sequence from the closed position of the circuit interrupter is as follows: In response to a trip signal, contact 104 closes to energize trip solenoid 76 which moves armature 74 upward to rotate lever 68 clockwise, thus collapsing the toggle linkage 54. This unlatches roller 52 allowing lever 38 to move clockwise and collapse the main toggle linkage 28, allowing the operating lever 16 to be moved clockwise by the opening spring 24, thus opening contacts 12. On the opening stroke, contact 102 closes and contact 100 opens.

It is to be understood that the hereindescribed arrangements are simply illustrative of the principles of the invention, and that other embodiments and applications are within the spirit and scope of the invention.

I claim as my invention:

1. In a circuit interrupter having separable contacts and operating means for opening and closing said contacts, said operating means including a toggle linkage that is collapsible and distendable, an electric motor having a rotatable output shaft, and means for distending the linkage in response to rotation of said shaft, said motor having an armature, said contacts being open in response to collapse of said linkage and closed in response to distention of said linkage, said operating means having holding means including releasable latching means for holding the toggle linkage in an over-center position when it is distended to said overcenter position, an energizing circuit for the motor including first switch means which when operated causes the motor to be energized, dynamic brake circuit means for braking the motor when the brake circuit means is connected across the motor armature, and second switch means responsive to rotation of said motor output shaft for, while said shaft is rotating, sequentially and in the order named, latching said first switch means in the operated position, connecting said brake circuit means across the motor armature, and unlatching said first switch means, said operating means and second switch means being coordinated so that the braking circuit is connected across the motor armature after said contacts have been closed, and said first switch is unlatched after the toggle linkage is distended overcenter.

2. The combination as in claim 1 wherein the second switch means is a rotatable switch means.

3. In a circuit interrupter having separable contacts and operating means for opening and closing said contacts, said operating means including a toggle linkage that is collapsible and distendable, an electric motor having a rotatable output shaft, and means for distending said linkage in response to rotation of said output shaft, said motor having an armature, said contacts being open in response to collapse of said linkage and closed in response to distention of said linkage, said operating means having holding means including releasable latching means for holding the toggle linkage in an overcenter position when the linkage is distended to said overcenter position, an energizing circuit for the motor including first switch means which when operated causes the motor to be energized, second switch means that is open in response to distention of the toggle linkage and closed in response to collapse of the toggle linkage, a command circuit including said second switch means for operating said first switch means in response to a command when said second switch means is in the closed position, said command circuit being inoperative when the second switch means is open, dynamic brake circuit means for braking the motor when the brake circuit means is connected across the motor armature, and third switch means responsive to rotation of said motor output shaft for, while said shaft is rotating, sequentially and in the order named latching said first switch means in the operating position, connecting said brake circuit means across the motor armature, and unlatching said first switch means, said operating means and third switch means being coordinated so that the braking circuit is connected across the motor armature after said contacts have been closed, and said first switch means in unlatched after the toggle linkage is distended overcenter.

4. The combination as in claim 3 wherein said third switch means is a rotatable switch means.

5. In a circuit interrupter having separable contacts and operating means for opening and closing said contacts, said operating means including a toggle linkage that is collapsible and distendable, an electric motor having a rotatable output shaft, and means for distending said linkage in response to rotation of said shaft, said motor having an armature, said contacts being open in response to collapse of said linkage and closed in response to distention of said linkage, said operating means also having holding means including releasable latching means for holding the toggle linkage in a particular distended position when the linkage is moved to that position, an enregizing circuit for the motor including first switch means which when operated causes the motor to be energized, dynamic brake circuit means for braking the motor when the brake circuit means is connected across the motor armature, and second switch means responsive to rotation of said motor shaft for, while said shaft is rotating, sequentially and in the order named, latching said first switch means in the operated position, connecting said brake circuit means across the motor armature, and unlatching said first switch means, said operating means and second switch means being coordinated so that the braking circuit is connected across the motor armature after said contacts have been closed, and said first switch means is unlatched after the toggle linkage has been moved to said particular distended position.

6. In a circuit interrupter having separable contacts and operating means for opening and closing said contacts, said operating means including a toggle linkage that is collapsible and distendable, an electric motor having a rotatable output shaft, and means for distending said linkage in response to rotation of said shaft, said motor having an armature, said contacts being open in response to collapse of said linkage and closed in response to distention of said linkage, said operating means also having holding means including releasable latching means for holding the toggle linkage in a particular distended position when the linkage is distended to that position, an energizing circuit for the motor including first switch means which when operated causes the motor to be energized, second switch means that is open in response to distention of the toggle linkage and closed in response to collapse of the toggle linkage, a command circuit including said second switch means for operating said first switch means in response to a command when said second switch means is in the closed position, said command circuit being inoperative when the second switch means is open, dynamic brake circuit means for braking the motor when the brake circuit means is connected across the motor armature, and third switch means responsive to rotation of said motor shaft for, while said shaft is rotating, sequentially and in the order named, latching said first switch means in the operating position, connecting said brake circuit means across the motor armature, and unlatching said first switch means, said operating means and third switch means being coordinated so that the braking circuit is connected across the motor armature after said contacts have been closed, and said first switch means in unlatched after the toggle linkage has been distended to said particular position.

References Cited by the Examiner

UNITED STATES PATENTS

| | | | |
|---|---|---|---|
| 2,726,363 | 12/55 | Scully | 318—379 |
| 2,858,395 | 10/58 | Harm et al. | 200—89.4 |

SAMUEL BERNSTEIN, *Primary Examiner.*

MAX L. LEVY, *Examiner.*